(12) United States Patent
Moraal et al.

(10) Patent No.: US 6,304,815 B1
(45) Date of Patent: Oct. 16, 2001

(54) METHOD FOR CONTROLLING AN EXHAUST GAS TEMPERATURE OF AN ENGINE FOR IMPROVED PERFORMANCE OF EXHAUST AFTERTREATMENT SYSTEMS

(75) Inventors: Paul Eduard Moraal, Vaals (NL); Alain Marie Roger Chevalier, Aubel (FR); Johannes Kuenstler, Aachen (DE); Urs Christen, Aachen (CH)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/538,521

(22) Filed: Mar. 29, 2000

(51) Int. Cl.⁷ .............. G06F 9/06; F01N 3/023
(52) U.S. Cl. .............. 701/115; 701/101; 60/285; 60/295
(58) Field of Search .............. 60/274, 276, 277, 60/280, 284, 285, 295; 123/676, 396, 399, 378; 701/109, 101, 102, 103, 114, 115

(56) References Cited

U.S. PATENT DOCUMENTS

| | | | |
|---|---|---|---|
| 4,211,075 | 7/1980 | Ludecke et al. | 60/285 |
| 4,467,601 | 8/1984 | Watanabe | 60/274 |
| 4,702,075 | 10/1987 | Jenny | 60/274 |
| 4,747,264 | 5/1988 | Santiago et al. | 60/274 |
| 4,756,155 | 7/1988 | Shinzawa | 60/285 |
| 4,884,398 | 12/1989 | Morita et al. | 60/274 |
| 5,042,248 | 8/1991 | Abthoff et al. | 60/274 |
| 5,050,376 | 9/1991 | Stiglic et al. | 60/274 |
| 5,195,316 | 3/1993 | Shinzawa et al. | 60/274 |
| 5,211,010 * | 5/1993 | Hirota | 60/280 |
| 5,287,698 | 2/1994 | Shinzawa et al. | 60/286 |
| 5,319,930 | 6/1994 | Shinzawa et al. | 60/286 |
| 5,544,639 * | 8/1996 | Shouda et al. | 123/676 |
| 5,771,686 | 6/1998 | Pischinger et al. | 60/274 |
| 6,032,461 * | 3/2000 | Kinugasa et al. | 60/295 |
| 6,041,591 * | 3/2000 | Kaneko et al. | 60/274 |

FOREIGN PATENT DOCUMENTS

| | | |
|---|---|---|
| 3610057 | 10/1986 | (DE). |
| 4234841 | 4/1993 | (DE). |
| 57-179348 | 11/1982 | (JP). |
| 59-150921 | 8/1984 | (JP). |
| 60-090931 | 5/1985 | (JP). |
| 61-218708 | 9/1986 | (JP). |
| 63-134810 | 6/1988 | (JP). |
| 01-087820 | 3/1989 | (JP). |
| 05-106518 | 4/1993 | (JP). |
| 7-189653 | 7/1995 | (JP). |

* cited by examiner

Primary Examiner—Willis R. Wolfe
(74) Attorney, Agent, or Firm—John F. Buckert; Allan J. Lippa

(57) ABSTRACT

A method for regenerating a particulate filter communicating with exhaust gases of an internal combustion engine 12 is provided. The method includes indicating that the particulate filter 48 needs to be regenerated. The method further includes adjusting the throttle valve 18 to decrease an amount of air inducted into one of the engine cylinders to increase a temperature of the exhaust gases while maintaining an engine speed above a predetermined engine speed. The method further includes increasing the speed of the engine 12 and injecting a predetermined amount of fuel into one of said cylinders late in a power stroke of the cylinder to further increase the temperature of the exhaust gases to regenerate the filter 48.

30 Claims, 6 Drawing Sheets

METHOD FOR CONTROLLING AN EXHAUST GAS TEMPERATURE OF AN ENGINE FOR IMPROVED PERFORMANCE OF EXHAUST AFTERTREATMENT SYSTEMS

FIELD OF THE INVENTION

This invention relates to a method for controlling an exhaust gas temperature of an internal combustion engine. In particular, the method relates to controlling the exhaust gas temperature to allow regeneration of an exhaust filter during low engine speeds or low engine load conditions.

BACKGROUND OF THE INVENTION

Emission after treatment devices are utilized to collect particulate matter from the exhaust gas of an internal combustion engine. In particular, conventional emission aftertreatment devices for diesel engines include particulate filters, oxidation catalysts, and nitrous oxide (NOx) catalysts. A problem associated with particulate filters is that the particulates, which consist largely of carbon particles, tend to plug the filters resulting in a restriction to the exhaust gas flow. A conventional method of regenerating/cleaning the filter involves increasing the exhaust gas temperature above a predetermined temperature (e.g., above 450° C.) to incinerate the carbon particles in the filter.

Conventional methods have increased the exhaust gas temperature of an engine by controlling a throttle valve in an intake manifold of the engine. In particular, it is known that by throttling/closing the throttle valve, the exhaust gas temperature may be increased. Further, numerous methodologies have been utilized for controlling the throttle valve. In one conventional method, the intake throttle valve is controlled utilizing the difference between a calculated target intake manifold pressure and an actual intake manifold pressure. The target intake manifold pressure is calculated using an engine speed and an engine load. This conventional method has a drawback of being unable to regenerate the particulate filter during low engine speeds or low engine load conditions because the required amount of throttling would result in unstable engine operation. Accordingly, when the engine is operating during low engine speeds or low engine load conditions, the particulate filter may become clogged creating an undesirable restriction in the exhaust gas flow and allowing increased exhaust gas emissions.

There is thus a need for a method of controlling an exhaust gas temperature of an engine during low engine speeds and/or low engine load conditions to initiate the regeneration of a particulate filter or the like.

SUMMARY OF THE INVENTION

The present invention provides a method of controlling an exhaust gas temperature of an engine to allow regeneration of an exhaust filter during low engine speeds and/or low engine load conditions.

A method for controlling an engine exhaust temperature in accordance with the present invention may be utilized in an engine having cylinders, an intake manifold, and a throttle valve disposed within the intake manifold. The method may include the steps of calculating a target engine operational parameter responsive to an air/fuel ratio of the engine and an engine speed error of the engine. The target operational parameter may comprise one of the following parameters: a target intake manifold pressure, a target intake manifold mass air flow, or a target air/fuel ratio. The method may further include the step of calculating a commanded position for the throttle valve responsive to the target engine operational parameter and a measured engine operational parameter. The measured engine operational parameter may comprise one of the following parameters: a measured intake manifold pressure, a measured intake manifold mass air flow, or a measured air/fuel ratio. The method may further include the step of controlling the throttle valve responsive to the commanded position to control the exhaust gas temperature. The method may further include the step of setting a commanded engine speed to a predetermined speed to further control the exhaust gas temperature. Finally, the method may include the step of injecting a predetermined amount of fuel into one of the cylinders of the engine late in a power stroke of the cylinder to further control the exhaust gas temperature.

A method for controlling the exhaust gas temperature of an engine in accordance with the present invention represents a significant improvement over conventional methods. In particular, the inventive method allows for the regeneration of particulate filters during low engine speeds conditions (e.g., an engine speed less than 1000 RPM) and/or low engine load conditions. As a result, the inventive method allows particulate filters to operate more effectively when the engine is idling or is being operated at relatively low speeds.

These and other features and advantages of this invention will become apparent to one skilled in the art from the following detailed description and the accompanying drawings illustrating features of this invention by way of example.

DETAILED DESCRIPTION OF THE PREFERRED EMBODIMENT

Figure 1:
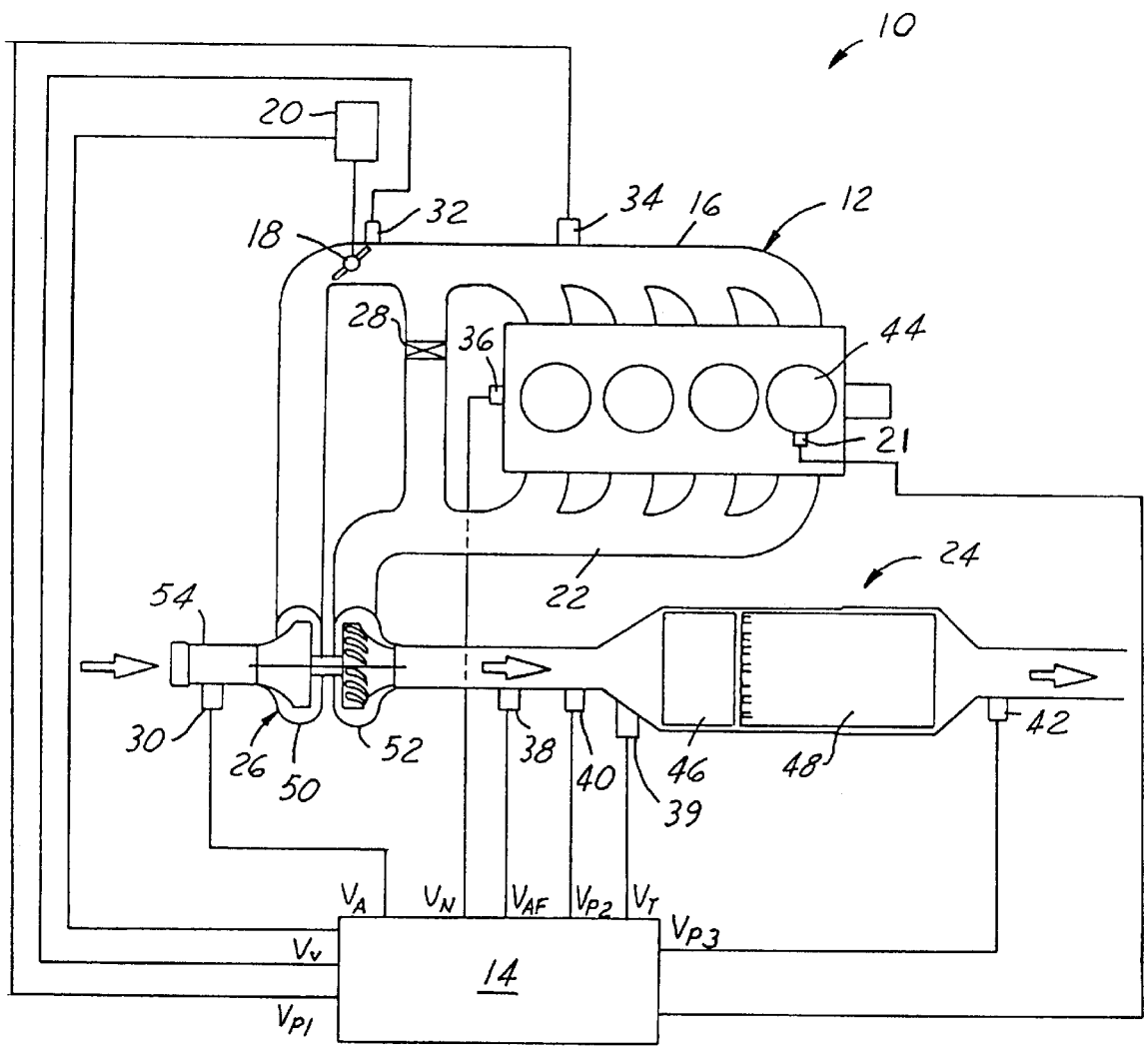
FIG. 1 is a combination schematic and block diagram of an engine and a control system for carrying out a method in accordance with the present invention.

Referring now to the drawings wherein like reference numerals are used to identify identical components in the various views, FIG. 1 illustrates an automotive vehicle generally indicated by numeral 10. The vehicle 10 includes an internal combustion engine 12 and a microcontroller 14.

The engine 12 may comprise an internal combustion engine such as a diesel engine. The engine 12 may include an intake manifold 16, a throttle valve 18, a throttle valve actuator 20, a fuel injector 21, an exhaust manifold 22, a filter assembly 24, a turbocharger 26, an EGR valve 28, a mass air flow sensor 30, a throttle valve position sensor 32, a pressure sensor 34, a speed sensor 36, an air/fuel sensor 38, and pressure sensors 40, 42.

The intake manifold 16 receives compressed air from the turbocharger 26 and directs the air flow to cylinders 44 of the engine 12. The configuration of the manifold 16 may vary based upon the number of cylinders 44. The manifold 16 includes the throttle valve 18 disposed therein.

The throttle valve 18 is provided to selectively restrict the amount of air flowing through the manifold 16 to thereby control the operation of the engine 12, and in particular to control the exhaust gas temperature of the engine 12. When the valve 18 is throttled (e.g., moved from a full-open position to a partially closed position), the exhaust gas temperature increases. The position of the valve 18 may be controlled to increase the exhaust gas temperature above a predetermined temperature (e.g., above 450° C.), to regenerate the filter assembly 24. The method for controlling the valve 18 to increase the exhaust gas temperature will be discussed in more detail hereinbelow. The valve 18 is conventional in the art and may comprise a conventional valve capable of restricting the air flow through the manifold 16. For example, the valve 18 may comprise a butterfly valve or the like.

The throttle valve actuator 20 is provided to move the valve 18 to a specified position. The actuator 20 is conventional in the art and may comprise a pneumatically controlled actuator or a stepper motor actuator or the like. The actuator 20 may respond to electrical signals generated by the microcontroller 14 to adjust the position of the valve 18, thereby varying the flow of air through the manifold 16.

The fuel injector 21 provides fuel to one of cylinders 44 and is conventional in the art. Although a single fuel injector 21 is illustrated for the purpose of clarity, it should be understood that each of cylinders 44 has a corresponding fuel injector 21. The fuel injector 21 receives fuel from a fuel pump (not shown) and injects a first predetermined amount of fuel into one of cylinders 44 during a power stroke of the respective cylinder 44. Further, the fuel injector 21 may be utilized to inject a second predetermined amount of fuel into one of the cylinders 44 late in the power stroke (i.e., post-injection of fuel) of the respective cylinder 44 to further control the exhaust gas temperature as described in further detail hereinbelow. In particular, the microcontroller 14 may generate control signals that cause the fuel injector 21 to inject the first and second predetermined amounts of fuel, respectively, into one of the cylinders 44.

The exhaust manifold 22 directs exhaust gas from the cylinders 44 through the turbocharger 26 to the filter assembly 24. The configuration of manifold 22 may vary based upon the number of cylinders 44 of the engine 12.

The filter assembly 24 is provided to lower the exhaust gas emissions/particulates before the exhaust gas is expelled from the engine 12. The assembly 24 may include an oxidation catalyst 46 and a particulate filter 48.

The oxidation catalyst 46 is utilized to increase the exhaust gas temperature of the engine 12 prior to the exhaust gas entering the particular filter 48. In particular, the post-injection of fuel into one or more cylinders 44 results in unburned hydrocarbons being expelled from the cylinders 44 into the oxidation catalyst 46. The oxidation of the hydrocarbons in the catalyst 46 is an exothermic reaction resulting in an additional increase in the exhaust gas temperature. Accordingly, the temperature of the exhaust gas exiting the oxidation catalyst may be substantially higher (e.g., up to 200° C. higher) than the exhaust gas entering the filter assembly 24. The exhaust gas within the oxidation catalyst is preferably heated to at least 450° C. before being expelled into the filter 48—which regenerates the filter 48.

The particulate filter 48 is provided to capture particulate matter such as carbon particles in the exhaust gas. The filter 48 may be conventional in the art and may comprise a steel-wool filter, a ceramic-monolith filter, or a ceramic-coil filter or the like. As discussed above, the filter 48 must be regenerated/cleaned at certain intervals since the filter 48 may become clogged with carbon particles from the exhaust gas. Further, the filter 48 may be regenerated by throttling the valve 18 and/or post-injecting fuel into the cylinders 44 to thereby increase the exhaust gas temperature above a predetermined incineration temperature (i.e., 450° C.) of the carbon particles.

The turbocharger 26 may be provided to compress the air inducted into the engine 12. The turbocharger 26 may include a compressor 50 connected to the intake manifold 16 and a turbine 52 disposed between the exhaust manifold 22 and the filter assembly 24.

The EGR valve 28 is provided to reduce NOx emissions from the engine 12. The valve 28 is conventional in the art and is disposed between the intake manifold 16 and the exhaust manifold 22.

The mass air flow sensor 30 generates a signal $V_A$ indicative of the mass air flow in the intake manifold 16. The microcontroller 14 may receive the signal $V_A$ and derive the measured value of mass air flow MAF from the signal $V_A$. The sensor 30 is conventional in the art and may be disposed in an inlet 54 upstream of the intake manifold 16.

The throttle valve sensor 32 generates a signal $V_V$ indicative of the position of the valve 18 and is conventional in the art. The microcontroller 14 may receive the signal $V_V$ and derive the measured position $THR_M$ of the valve 18 from the signal $V_V$. In a constructed embodiment, the measured position $THR_M$ of the valve 18 may have a range from 0–1 wherein the value 0 represents a full-open position (i.e., no throttling) of the valve 18 and the value 1 represents a full-closed position of the valve 18. It should be understood, however, that the position of the valve 18 may represented in a plurality of alternate ways. For example, the position of the valve 18 can be represented by a percentage of the full-open or full-closed position or by a rotation angle associated with the valve 18.

The pressure sensor 34 generates a signal $V_{P1}$ indicative of the pressure within the intake manifold 16. The microcontroller 14 receives the signal $V_{P1}$ and derive the measured value of the intake manifold pressure P from the signal $V_{P1}$. The pressure sensor 34 is conventional in the art.

The speed sensor 36 generates a signal $V_N$ indicative of the speed of a crankshaft of the engine 12. The microcontroller 14 receives signal $V_N$ and derives the measured value of the engine speed N from the signal $V_N$. The speed sensor 36 is conventional in the art.

The air/fuel ratio sensor 38 generates a signal $V_{AF}$ indicative of the air/fuel ratio of the engine 12. The microcontroller 14 receives the signal $V_{AF}$ and derives the measured value of the air/fuel ratio AF from the signal $V_{AF}$. The sensor 38 is conventional in the art and is disposed between the turbine 52 and the filter assembly 24.

The temperature sensor 39 generates a signal $V_T$, indicative of the temperature at the inlet of the filter assembly 24. The microcontroller 14 receives the signal $V_T$ and derives the measured value of the exhaust gas temperature T of the exhaust gas entering the filter assembly 24 from the signal $V_T$.

The pressure sensors 40, 42 generate signals $V_{P2}$, $V_{P3}$ respectively, indicative of the pressures at the inlet and outlet, respectively, of the filter assembly 24. The microcontroller 14 receives signals $V_{P2}$, $V_{P3}$ and derives the measured values of the inlet and outlet pressures $P_I$, $P_O$, from the signals $V_{P2}$, $V_{P3}$, respectively. Alternately, the pressure sensors 40, 42 may be replaced by a single differential pressure sensor (not shown) that generates a signal indicative of the pressure drop across the filter assembly 24. The microcontroller 14 may determine whether a regeneration of filter 48 is required based upon the difference between the inlet and outlet pressures $P_I$, $P_O$.

The microcontroller 14 is provided to control the engine 12 and in particular to control the throttle valve 18. The microcontroller 14 is conventional in the art and is electrically connected to the throttle valve actuator 20, the fuel injector 21, the mass air flow sensor 30, the throttle valve position sensor 32, the pressure sensor 34, the speed sensor 36, the air/fuel ratio sensor 38, the temperature sensor 39, and the pressure sensors 40, 42. The microcontroller 14 includes a read-only memory (ROM) (not shown) that stores a software program for implementing the method in accordance with the present invention.

A general overview of the method of controlling the exhaust gas temperature of an engine by controlling the throttle valve 18 will be described before proceeding with a detailed description of the entire inventive method.

A target engine operational parameter TP is calculated responsive to the engine speed error $N_{ERR}$ and the air/fuel ratio AF. The parameter TP is set to a value that ensures that the control of the engine speed and the air/fuel ratio always receive priority over control of the engine exhaust temperature to prevent stalling of the engine 12 or excessive particulate production due to overfueling the engine 12. The parameter TP may comprise: (i) a target intake manifold pressure, (ii) a target intake manifold mass air flow, or (iii) a target air/fuel ratio. The parameter TP is calculated by adding a target reference offset TO to a base engine operational parameter BP.

The target reference offset TO is calculated responsive to the engine speed error $N_{ERR}$ and the air/fuel ratio AF. The target reference offset TO may comprise: (i) a target intake manifold pressure offset, (ii) a target intake manifold mass air flow offset, or (iii) a target air/fuel ratio offset. If the engine speed error $N_{ERR}$ is a negative number (i.e., engine speed N is less than commanded engine speed $N_C$), the target reference offset TO is increased by a calculated amount. Similarly, if the air/fuel ratio AF is less than a minimum air/fuel ratio $AF_{MIN}$ (necessary for proper engine combustion), the target reference offset TO is increased by a calculated amount. Alternately, if the error $N_{ERR}$ is a positive number, the target reference offset TO is not changed. Similarly, if the air/fuel ratio AF is greater than the minimum air/fuel ratio $AF_{MIN}$, the offset TO is not changed.

The base engine operational parameter BP may comprise a base (minimum) threshold value for allowing combustion stability within the engine 12 while also providing for relatively high exhaust gas temperatures. The parameter BP may comprise: (i) a base intake manifold pressure, (ii) a base intake manifold mass air flow, or (iii) a base air/fuel ratio. The parameter BP may be derived from the engine speed N and the engine load (determined indirectly by the accelerator pedal position) by reference to a table in the ROM (not shown) of the microcontroller 14 containing a set of values of the parameter BP which vary as a function of the engine speed N and the engine load. Further, the values for the parameter BP are readily determined during initial engine testing of the engine 12 by those skilled in the art. In particular, the value for the parameter BP is determined such that at a measured engine speed and a measured engine load, a required exhaust gas temperature is reached in the engine 12. It should be understood that the parameter BP will be added to a target reference offset TO with identical measurement units to obtain the target engine operational parameter TP. For example, a parameter BP—corresponding to a base intake manifold pressure may be added to an offset TO—corresponding to a target intake manifold pressure offset to obtain a parameter TP—corresponding to a target intake manifold pressure.

An engine operational parameter error $P_{ERR}$ is utilized to calculate a commanded position $THR_{CMD}$ of the throttle valve 18. The error $P_{ERR}$ is calculated by subtracting the target engine operational parameter TP from a measured engine operational parameter MP. The parameter MP may comprise: (i) a measured intake manifold pressure P, (ii) a measured intake manifold mass air flow MAF, or (iii) a measured air/fuel ratio AF. Accordingly, the error $P_{ERR}$ may comprise: (i) an intake manifold pressure error, (ii) an intake manifold mass air flow error, or (iii) an air/fuel ratio error. It should be understood that the parameter TP will be subtracted from a parameter MP with identical measurement units to obtain the error $P_{ERR}$. For example, the parameter TP—corresponding to a target intake manifold pressure—may be subtracted from the parameter MP—corresponding to the measured intake manifold pressure P—to obtain an intake manifold pressure error.

The commanded position $THR_{CMD}$ is calculated responsive to the target engine operational parameter TP and the measured engine operation parameter MP. More specifically, the commanded position $THR_{CMD}$ is calculated responsive to engine operational parameter error $P_{ERR}$ ($P_{ERR}$=MP–TP). An error $P_{ERR}$ that is a negative value indicates that the throttle valve 18 is over throttled and therefore the commanded position $THR_{CMD}$ should be set to a value that opens the valve 18 further (i.e., $THR_{CMD}$ should be decreased towards the value 0). For example, if the error $P_{ERR}$ represents an intake manifold pressure error that has a negative value (i.e., measured intake manifold pressure P less than target intake manifold pressure), the inventive method will set the commanded position $THR_{CMD}$ to a value that opens the valve 18 further—which increases the measured intake manifold pressure P towards the target intake manifold pressure as desired. Alternately, an error $P_{ERR}$ that is a positive value indicates that the throttle valve 18 is under throttled and therefore $THR_{CMD}$ should be set to a value that closes valve 18 further (i.e., $THR_{CMD}$ should be increased towards the value 1). For example, if the error $P_{ERR}$ represents an intake manifold pressure error that has a positive value (i.e., measured intake manifold pressure P greater than target intake manifold pressure), the inventive method will set the commanded position $THR_{CMD}$ to a value that closes the valve 18 further—which decreases the measured intake manifold pressure P towards the target intake manifold pressure as desired.

The microcontroller 14 operates in accordance with a software program stored in the ROM (not shown) which implements the method of controlling an exhaust gas temperature in accordance with the present invention. FIGS. 2A–G form a flowchart of the inventive method that is implemented by the software program.

Figure 2A:
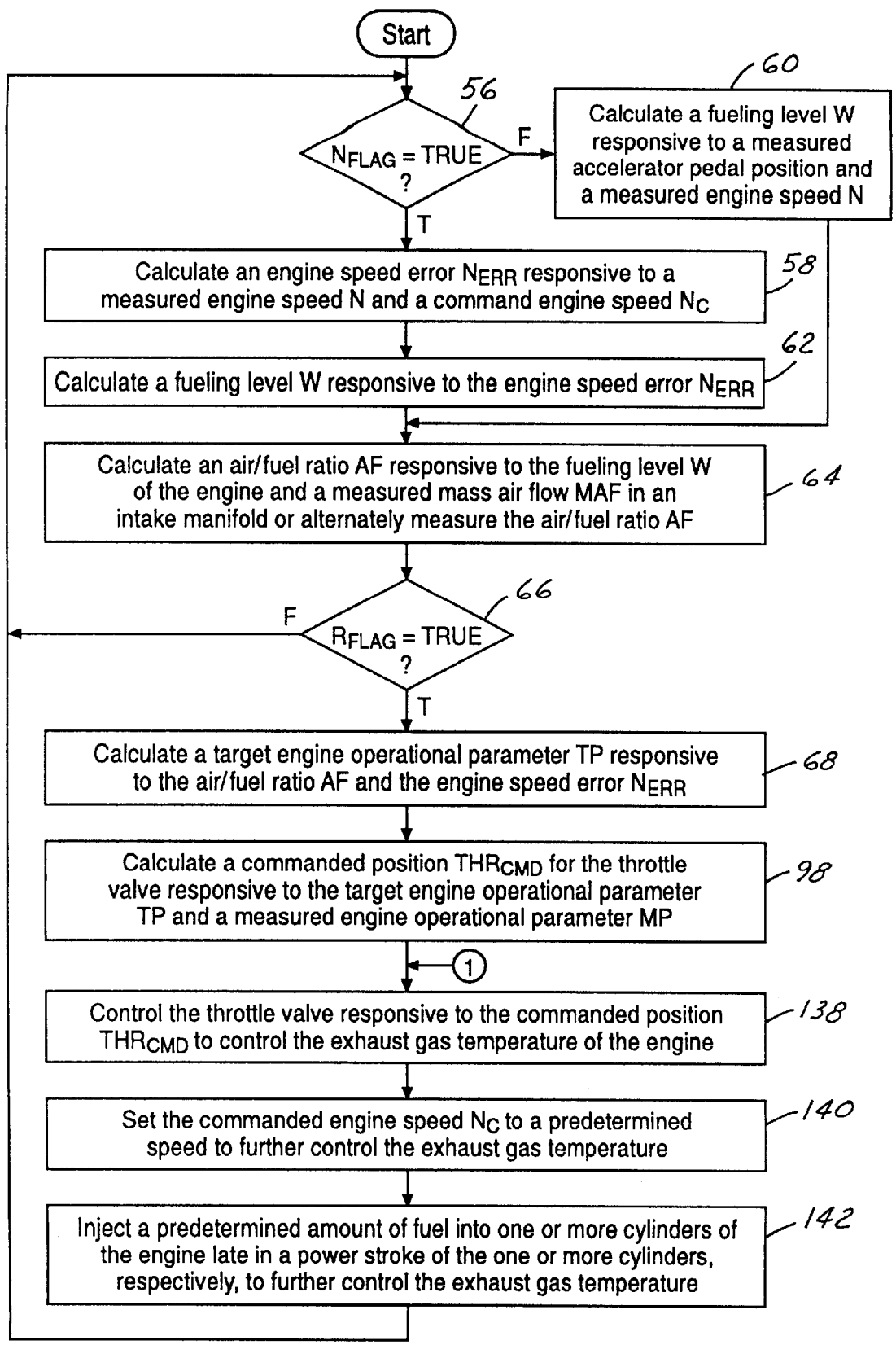
FIGS. 2A–G are flow charts illustrating a method for controlling an exhaust gas temperature of an engine in accordance with the present invention.

Referring to FIGS. 2A–G, a method of controlling an exhaust gas temperature of an engine in accordance with the present invention will be described. Referring to FIG. 2A, the method may include a step 56 that determines if the speed control flag $N_{FLAG}$ is equal to a true condition or a false condition. The microcontroller 14 sets the speed control flag $N_{FLAG}$ to a true condition only if the engine 12 is in the idling condition (accelerator pedal position equal to zero) or during a cruise control condition of the engine 12. If the speed control flag $N_{FLAG}$ is equal to a true condition, the method may advance to a step 58. If the speed control $N_{FLAG}$ is equal to a false condition, the method may advance to a step 60.

The method may further include the step 58 that calculates the engine speed error $N_{ERR}$ responsive to the measured engine speed N and a commanded engine speed $N_C$. The engine speed error $N_{ERR}$ may be obtained using the following formula: $N_{ERR}=N-N_C$.

The method may further include the step 62 following the step 58 that calculates a fueling level W responsive to the engine speed error $N_{EER}$. The fueling level W may be calculated using the following two formulas:

$$X=X+(\Delta T^*N_{ERR}); \text{ and } W=(Ka^*N_{ERR})+(Kb^*X); \text{ where}$$

X=an integrated value of $N_{ERR}$
$\Delta T$=sampling time of the method
Ka=a proportional gain
Kb=an integration gain The method may further include a step 64 following the step 62 that calculates an air/fuel ratio AF responsive to the fueling level W of the engine 12 and the mass air flow MAF in the intake manifold 16. The air/fuel ratio AF may be calculated using the following formula: AF=MAF/W. In an alternate embodiment, the air/fuel ratio AF may be calculated as disclosed in commonly owned U.S. patent application Ser. No. 09/236,991, filed on Jan. 26, 1999, and incorporated herein by reference in its entirety. In yet another alternate embodiment, the step 64 may measure the air/fuel ratio AF using the air/fuel ratio sensor 38 instead of calculating the air/fuel ratio AF.

In the step 60, if the speed control flag $N_{FLAG}$ is equal to a false condition (indicating that engine 12 is not in idle mode or cruise control mode), the fueling level W is calculated responsive to a measured accelerator pedal position and the engine speed N. After the step 60, the method advances to a step 64.

The method may further include a step 66 after the step 64 that determines if the regeneration flag $R_{FLAG}$ is set to a true condition or a false condition. The microcontroller 14 sets the regeneration flag $R_{FLAG}$ to a true condition if the microcontroller 14 has determined that the filter 48 needs to be regenerated. Several methodologies may be utilized to determine when to initiate regeneration of the filter 48. For example, a pressure difference $\Delta P$ between the inlet and outlet pressures $P_I$, $P_O$, of filter assembly 24, may be used to determine when to initiate regeneration. It is well known that when the filter 48 becomes clogged with carbon particles, the pressure difference $\Delta P$ increases. Accordingly, if the pressure difference $\Delta P$ is greater than a predetermined pressure difference, the microcontroller 14 may set the regeneration flag $R_{FLAG}$ to the true condition. If the regeneration flag $R_{FLAG}$ is equal to the true condition, the method may advance to a step 68. If the regeneration flag $R_{FLAG}$ is equal to the false condition, the method may advance to the step 56.

The method may further include the step 68 following the step 66 that calculates the target engine operational parameter TP responsive to the air/fuel ratio AF and the engine speed error $N_{ERR}$.

Figure 2B:
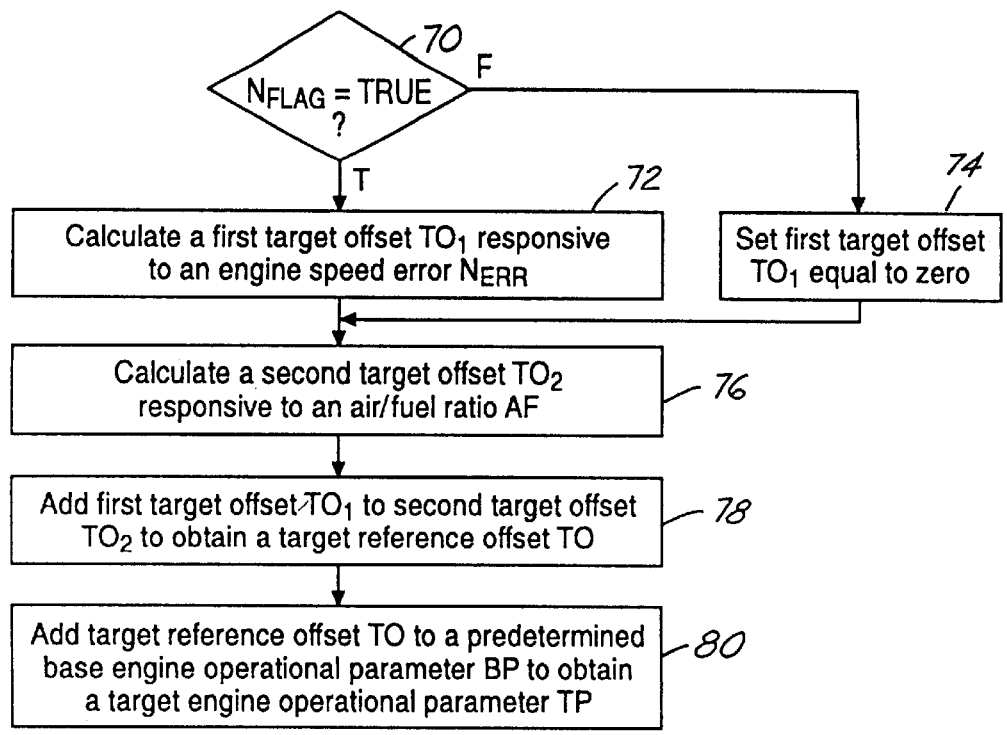

Referring to FIG. 2B, the step 68 may include the substeps 70, 72, 74, 76, 78, and 80. In the substep 70, the microcontroller 14 determines if the speed control flag $N_{FLAG}$ is equal to a true condition. If the flag $N_{FLAG}$ is equal to a true condition (idle mode or cruise control mode), the method may advance to the substep 72. If the flag $N_{FLAG}$ is equal to a false condition, the method may advance to the substep 74.

Figures 2C, 2D:
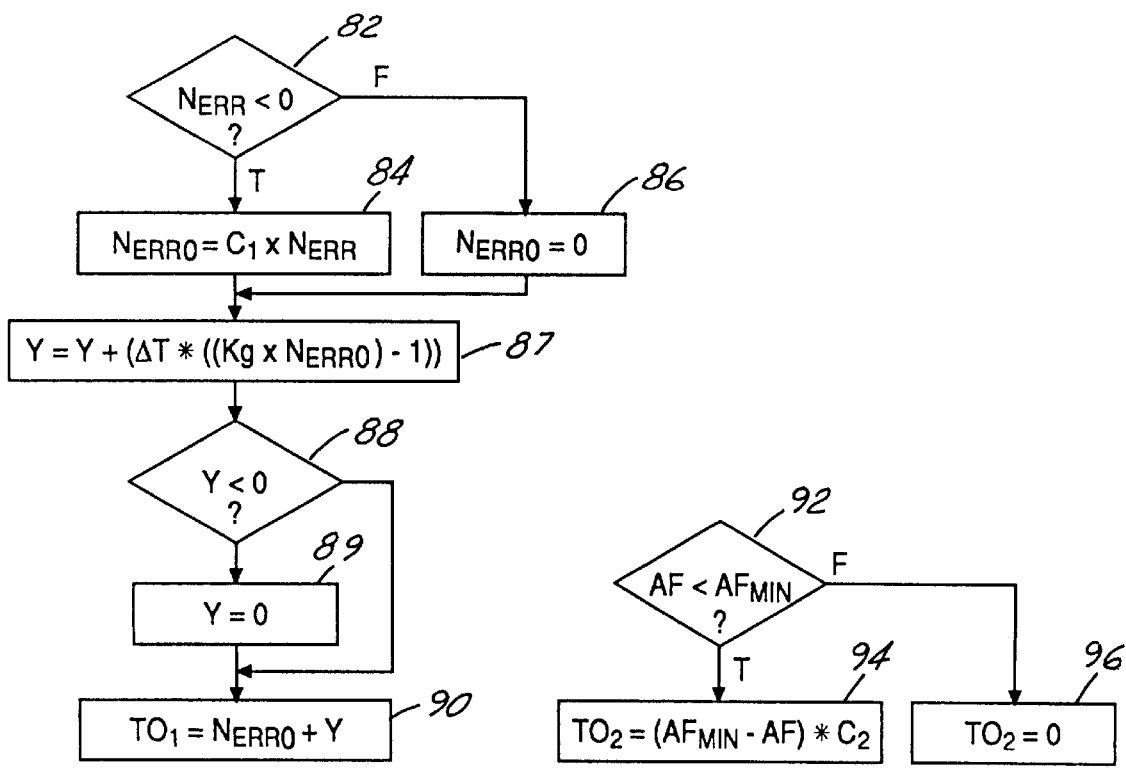

In the substep 72, a first target offset $TO_1$ is calculated responsive to the engine speed error $N_{ERR}$. Referring to FIG. 2C, the substep 72 may include the substeps 82, 84, 86, 87, 88, 89, and 90. In the substep 82, the microcontroller 14 determines if the engine speed error $N_{ERR}$ has a negative value which corresponds to the engine 12 operating at a speed N less than the commanded engine speed $N_C$. If the engine speed error $N_{ERR}$ has a negative value, the engine speed error $N_{ERR}$ is multiplied by a value $C_1$ ($C_1>1$) to obtain a value $N_{ERR0}$ in step 84. The value $C_1$ is utilized to increase an engine speed error $N_{ERR}$ having a negative value (corresponding to a over throttling condition of valve 18). If the engine speed error $N_{ERR}$ has a positive value, the value $N_{ERR0}$ is set equal to zero in the step 86. In the step 87, a value Y is calculated using the following formula: $Y=Y+(\Delta T^*((Kg^*N_{ERR0})-1))$; where Y=an integrated value proportional to $N_{ERR}$
Kg=a proportional gain wherein Kg<0
$\Delta T$=sampling time of the method The step 88 determines if the value of the integrated value Y is less than zero. If the value Y is less than zero, the value Y is set equal to zero in the step 89. Accordingly, the lower limit of the value Y is equal to zero. In the step 90, the first target offset $TO_1$ is calculated using the following calculation: $TO_1=N_{ERR0}+Y$.

Referring to FIG. 2B, the substep 74 sets the first target offset $TO_1$ equal to zero if the speed control flag $N_{FLAG}$ is equal to a false condition in the substep 70.

The substep 76 calculates a second target offset $TO_2$ responsive to the air/fuel ratio AF. Referring to FIG. 2D, the substep 76 may include the substeps 92, 94, and 96. In the substep 92, the air/fuel ratio AF is compared to a minimum air/fuel ratio $AF_{MIN}$ necessary for proper engine combustion. If the air/fuel ratio AF is less than the minimum air/fuel ratio $AF_{MIN}$, the second target offset $TO_2$ is calculated in the substep 94 using the following equation: $TO_2=(AF_{MIN}-AF)*C_2$; where $C_2>1$. If the air/fuel ratio AF is greater than or equal to the minimum air/fuel ratio $AF_{MIN}$, the second target offset $T0_2$ is set equal to zero in the step 96.

Referring to FIG. 2B, the substep 78 following the substep 76 adds the first target offset $TO_1$ to the second target offset $TO_2$ to obtain a target reference offset TO.

The substep 80 after the substep 78 adds the target reference offset TO to a predetermined base engine operational parameter BP to obtain a target engine operational parameter TP. As discussed above, the parameter BP may comprise a base (minimum) threshold value that will still allow combustion stability within the engine 12 and allow for relatively high engine exhaust temperatures. Further, the parameter BP is readily determined through engine testing by those skilled in the art.

Figure 2E:
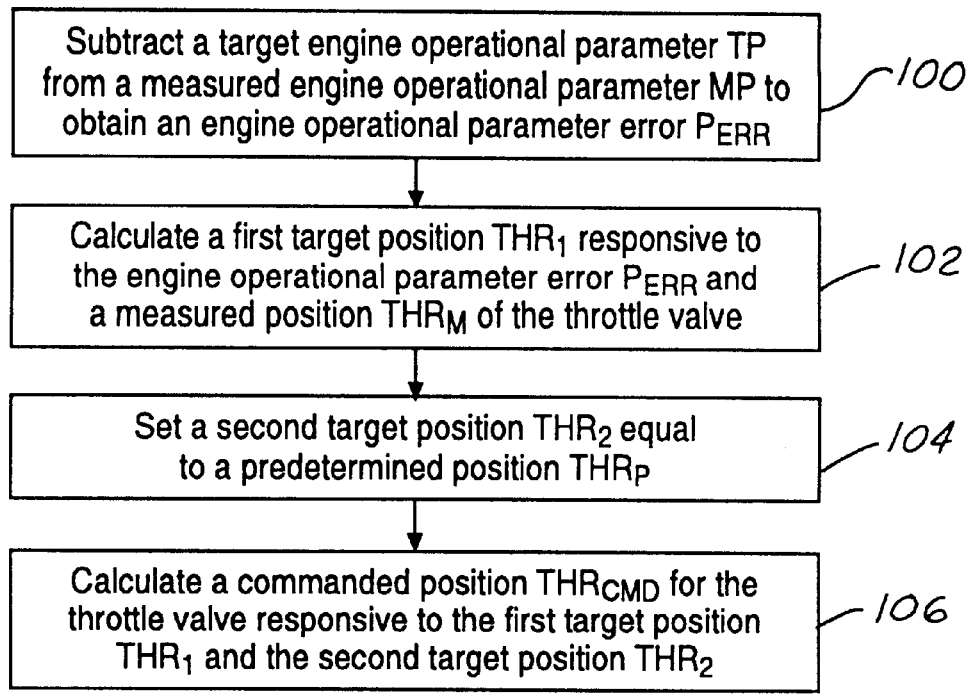

Referring to FIG. 2A, the method may further include a step 98 that calculates a commanded position $THR_{CMD}$ for the throttle valve 18 responsive to the target engine operational parameter TP and a measured engine operational parameter MP. Referring to FIG. 2E, the substep 98 may include the substeps 100, 102, 104, and 106. In the substep 100, the target engine operational parameter TP is subtracted from the measured engine operational parameter MP to obtain an engine operational parameter error $P_{ERR}$.

Figure 2F:
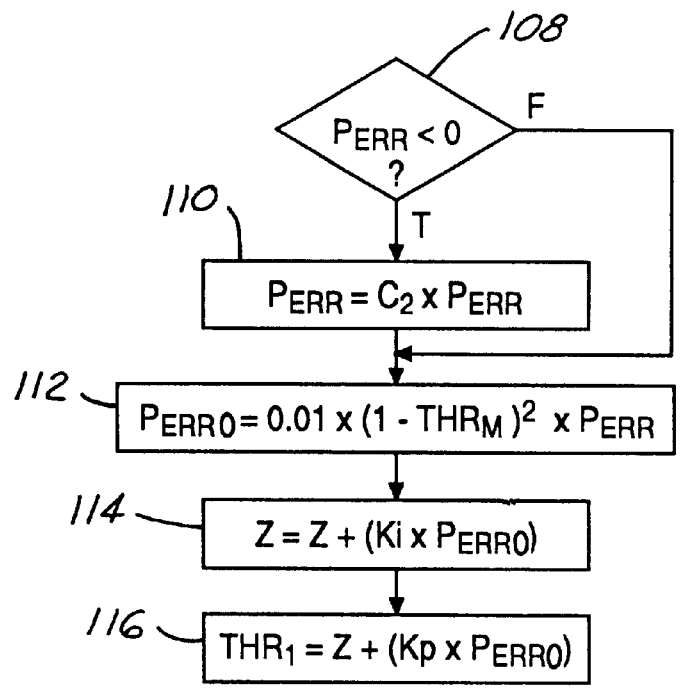

In the substep 102, a first target position $THR_1$ is calculated responsive to the engine operational parameter error $P_{ERR}$ and a measured position $THR_M$ of the throttle valve 18. Referring to FIG. 2F, the substep 102 may comprise the substeps 108, 110, 112, 114, and 116.

In the substep 108 the engine operational parameter error $P_{ERR}$ is checked to determine if the error $P_{ERR}$ is a negative value—indicating that the measured engine operational parameter MP is less than the target engine operational parameter TP. If the error $P_{ERR}$ is a negative value, the substep 110 multiplies error $P_{ERR}$ by a value $C_2$ where $C_2>1$. In the substep 112, the value $P_{EER0}$ is calculated using the following equation: $P_{ERR0}=0.01*(1-THR_M)^2*P_{ERR}$. The numeral "1" in the foregoing equation represents the full-closed position of the valve 18. It should be understood, however, if the measured throttle position $THR_M$ is expressed in a percentage (i.e., 0–100%) of throttling or other units, the numeral "1" would be modified accordingly to represent the full-closed position. The scaling factor $(1-THR_M)^2$ is used to compensate for the nonlinear characteristics between the measured position $THR_M$ of the throttle valve 18 and the target engine operational parameter TP—to prevent over throttling the valve 18. For example, if the parameter TP corresponds to a target intake manifold pressure and the valve 18 is in the full-open position $(THR_M=0)$, a relatively small change in the commanded position $THR_{CMD}$ of the valve 18 will have a minimal effect on the measured intake manifold pressure—because the air flow through the manifold 16 is still unrestricted. However, when the valve 18 is almost in the full-closed position (e.g., $THR_M=0.9$) a relatively small change in the commanded position $THR_{CMD}$ of the valve 18 may have a considerable effect on the measured intake manifold pressure—because the air flow through the manifold 16 is almost completely restricted. Accordingly, if the measured position $THR_M$ of the valve 18 approaches the full-closed position $(THR_M=1)$, the scaling factor $(1-THR_M)^2$ substantially decreases the calculated error $P_{ERR0}$ which provides for a relatively small change in the commanded position $THR_{CMD}$ of the valve 18. Alternately, if the measured position $THR_M$ of the valve 18 approaches the full-open position $(THR_M=0)$, the scaling factor $(1-THR_M)^2$ decreases the calculated error $P_{ERR0}$ by a relatively small amount which provides for a relatively larger change in the commanded position $THR_{CMD}$ of the valve 18.

In the substep 114 the value Z is calculated using the following equation: $Z=Z+(Ki*P_{ERR0})$ where Z represents the integrated value of the error $P_{ERR0}$ and Ki represents an integration gain that is preferably greater than zero (Ki>0). In the substep 116, the first target position $THR_1$ is calculated using the following equation: $THR_1=Z+(Kp*P_{ERR0})$; where Kp represents a proportional gain that is preferably greater than zero (Kp>0).

Referring to FIG. 2E, the substep 104 after the substep 102 sets a second target position $THR_2$ equal to a predetermined position $THR_P$ (e.g., $THR_M=0.7$) of the throttle valve 18. The position $THR_P$ represents a threshold throttle valve position for causing an increase in the exhaust gas temperature of the engine 12. Accordingly, any further throttling of the valve 18 from the position $THR_P$ results in an increase in the exhaust gas temperature. The position $THR_P$ is utilized to preset the position of the throttle valve 18 to provide a faster response time for increasing the exhaust gas temperature.

Figure 2G:
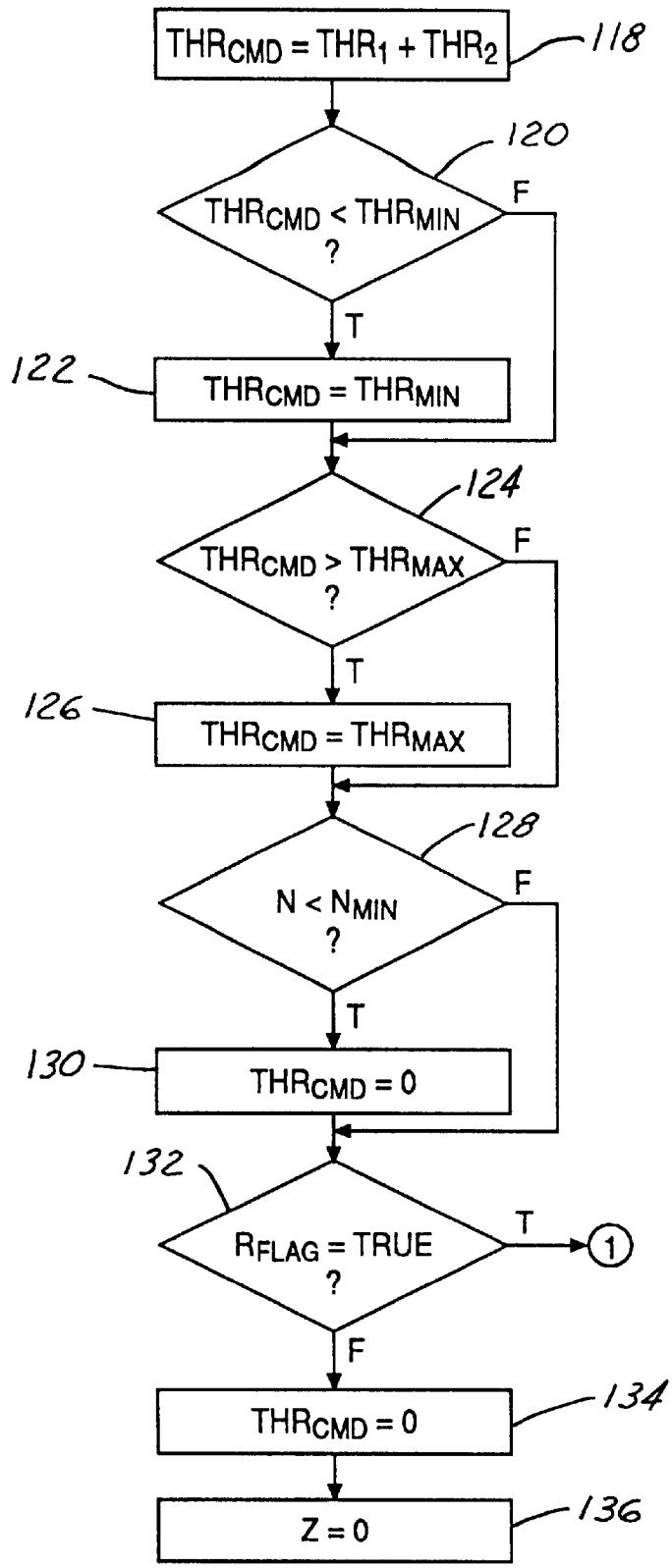

In the substep 106, the commanded position $THR_{CMD}$ for the throttle valve 18 is calculated responsive to the first target position $THR_1$ and the second target position $THR_2$. Referring to FIG. 2G, the substep 106 may include the substeps 118, 120, 122, 124, 126, 128, 130, 132, 134, and 136. In the substep 118, the first target position $THR_1$ is added to the second target position $THR_2$ to obtain the commanded position $THR_{CMD}$ of the throttle valve 18.

The substep 120 determines if the commanded position $THR_{CMD}$ of the valve 18 is less than a minimum throttle valve position $THR_{MIN}$. The minimum valve position $THR_{MIN}$ is preferably equal to zero representing the full-open position of the valve 18. If the commanded position $THR_{CMD}$ is less than the minimum throttle valve position $THR_{MIN}$, the substep 122 sets the position $THR_{CMD}$ equal to the position $THR_{MIN}$ before advancing to the substep 124.

The substep 124 determines if the commanded position $THR_{CMD}$ of the throttle valve 18 is greater than a maximum throttle valve position $THR_{MAX}$. The position $THR_{MAX}$ is preferably equal to one representing the full-closed position of the valve 18. If the commanded position $THR_{CMD}$ is greater than the maximum throttle valve position $THR_{MAX}$, the substep 126 sets the position $THR_{CMD}$ equal to the position $THR_{MAX}$ before advancing to the substep 128.

The substep 128 determines if the measured engine speed N is less than a minimum engine speed $N_{MIN}$ required for proper operation of the engine 12. If the engine speed N is less than the minimum engine speed $N_{MIN}$, the commanded position $THR_{CMD}$ of the valve 18 is set to the full-open position $(THR_{CMD}=0)$ in substep 130. Accordingly, the method ensures that the speed of the engine 12 is always maintained above the minimum allowable engine speed $N_{MIN}$.

The substep 132 determines if the regeneration flag $R_{FLAG}$ is set to a true condition or a false condition. If the regeneration flag $R_{FLAG}$ is set to the true condition (indicating that the filter 48 should be regenerated), the method advances to the step 138 (shown in FIG. 2A). If the flag $R_{FLAG}$ is set to a false condition, the substep 134 sets the commanded position $THR_{CMD}$ of the throttle valve 18 to the full-open position $(THR_{CMD}=0)$ and the substep 136 sets the integrated value of $P_{ERR0}$ equal to zero.

Referring to FIG. 2A, the method may further include a step 138 that controls the throttle valve 18 responsive to the commanded position $THR_{CMD}$ to control the exhaust gas temperature of the engine 12.

The method may further include a step 140 that sets a commanded engine speed $N_C$ to a predetermined speed to further control the exhaust temperature of the engine 12. The predetermined speed may be a slightly increased idle speed between about 700 RPM to 1000 RPM.

Finally, the method may include a step 142 that injects a second predetermined amount of fuel into one or more of the cylinders 44 of the engine 12 late in a power stroke (i.e., post-injection of fuel) of the one or more cylinders 44, respectively, to further control the exhaust temperature. In particular, the microcontroller 14 may generate a control signal that causes the fuel injector 21 to inject the second predetermined amount of fuel into one of the cylinders 44. The post-injection of fuel may be initiated when the temperature of the exhaust gas in the oxidation catalyst 46 reaches a temperature of 200° C. In response, the exhaust gas temperature within the oxidation catalyst 46 is increased as discussed above.

From the foregoing description of the inventive method, it should be understood that the commanded position $THR_{CMD}$ of the valve 18 and the commanded engine speed $N_C$ may be utilized to increase the exhaust gas temperature of the engine 12 above 450° C. to allow regeneration of the filter 48. Alternately, the commanded position $THR_{CMD}$, the commanded engine speed $N_C$, and the post-injection of fuel into one or more cylinders 44 may be utilized to increase the exhaust gas temperature of the engine 12 above 450° C. to allow regeneration of the filter 48.

Referring to FIGS. 3A–F, the parameters of a diesel engine controlled by the inventive method are illustrated. More specifically, FIGS. 3A–F illustrate how the inventive method is utilized to control the throttle valve 18 and the engine speed of the engine 12 to increase the exhaust gas temperature above a predetermined temperature (e.g., 450°

C.)—to thereby regenerate the filter 48. In the illustrated embodiment, the target engine operational parameter TP corresponds to a target intake manifold pressure $P_T$. Further, the measured engine operational parameter MP corresponds to a measured intake manifold pressure $P_M$. Accordingly, the target intake manifold pressure $P_T$ and the measured intake manifold pressure $P_M$ are utilized to control the throttle valve 18.

Figure 3A:
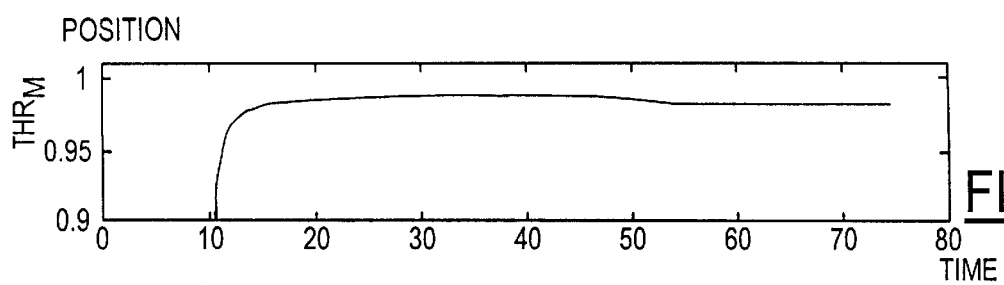
FIGS. 3A–F are diagrams illustrating engine parameters in accordance with a method for controlling an exhaust gas temperature of an engine in accordance with the present invention.
Figure 3B:
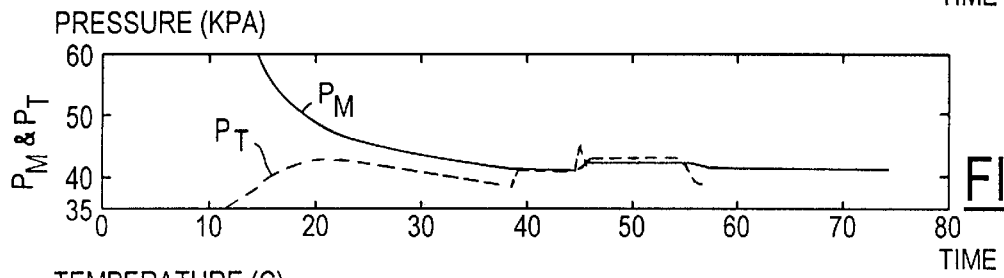
Figure 3C:
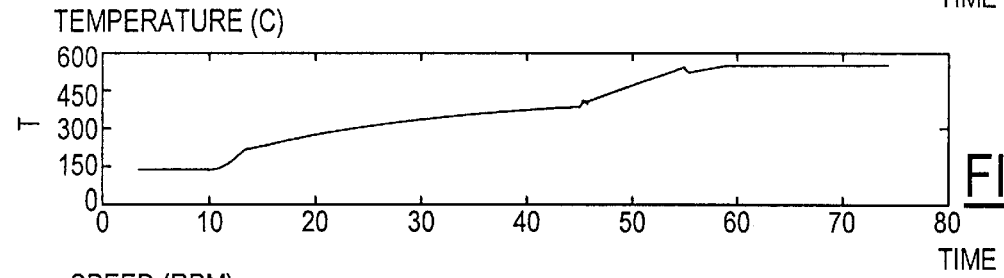
Figure 3D:
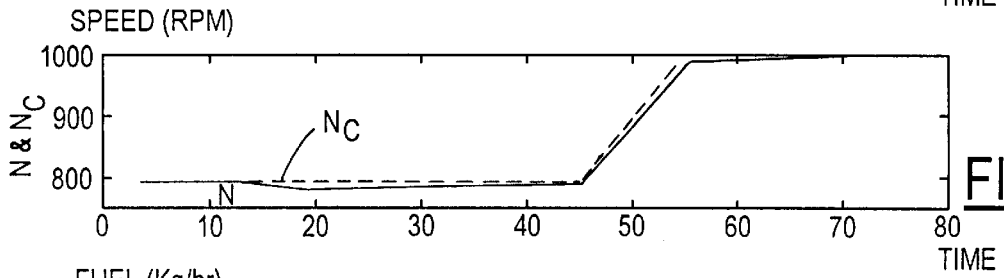
Figure 3E:
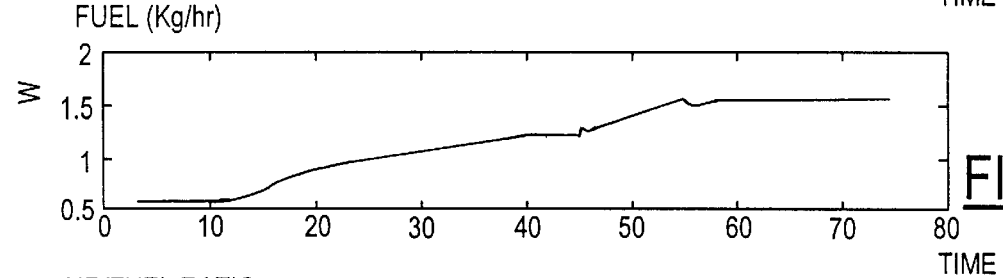

Referring to FIGS. 2A, 3A, and 3D, during the first ten seconds of operation of the engine 12, the speed control flag $N_{FLAG}$ is set to a true condition (indicating idle mode) and the steps 58, 62 maintain the engine speed N at the commanded engine speed $N_C$ equal to 800 RPM. Referring to FIG. 3C, during the first ten seconds the exhaust gas temperature T is approximately 150° C. which is below the temperature required to initiate regeneration of the filter 48. At time T=10 seconds, the step 66 determines that the regeneration flag $R_{FLAG}$ is set to a true condition (indicating filter 48 should be regenerated). Referring to FIG. 3B, the target intake manifold pressure $P_T$ is equal to 35 kilopascals (kpa) and the measured intake manifold pressure is equal to 60 kPa. In response to the large difference between the measured intake manifold pressure $P_M$ and the target intake manifold pressure $P_T$ (i.e., intake manifold pressure error), the steps 68, 98 modify the commanded position $THR_{CMD}$ of throttle valve 18 and the step 138 directs the actuator 20 to begin throttling the throttle valve 18 (as shown in FIG. 3A) to lower the pressure $P_M$ towards the pressure $P_T$.

Referring to FIGS. 3B and 3D at time T=15 seconds, in response to the throttling of the throttle valve 18, the measured intake manifold pressure $P_M$ decreases to 55 kPa and the engine speed N falls below the commanded engine speed $N_C$. In response, the step 68 increases the target intake manifold pressure $P_T$ (over time interval T=10–18 seconds) to prevent further throttling of the valve 18 to thereby increase the engine speed N towards the commanded engine speed $N_C$. At approximately time T=22 seconds, when the engine speed error $N_{ERR}$ ($N_{ERR}=N-N_C$) has been reduced sufficiently, the target intake manifold pressure $P_T$ is again gradually reduced (over time interval T=22–38 seconds). Referring to FIG. 3C, as a result of the step 138 throttling the throttle valve 18, the engine exhaust temperature T is increased to about 400° C. at time T=38 seconds.

Figure 3F:
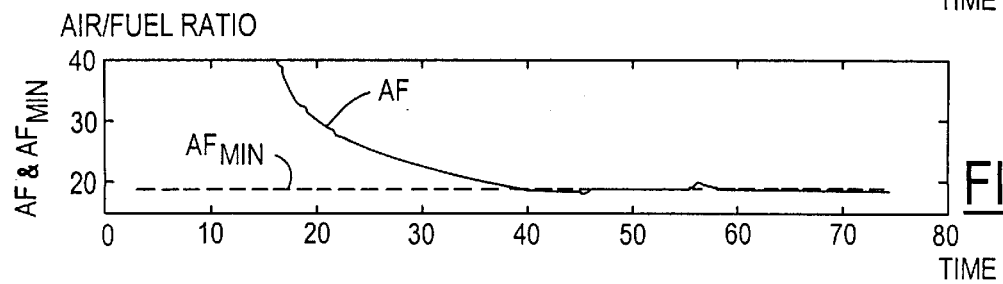

Referring to FIG. 3F at time T=38 seconds, the measured air/fuel ratio AF has fallen slightly below the minimum air/fuel ratio $AF_{MIN}$. In response, the step 68 increases the target intake manifold pressure $P_T$ to ensure that the measured air/fuel ratio AF does not decrease any further.

Referring to FIG. 3D at time T=45 seconds, the step 140 increases the commanded engine speed $N_C$ gradually from 800 RPM to 1000 RPM. Because of the resulting engine speed error $N_{EER}$ ($N_{EER}=N-N_C$) and a small decrease in the measured air/fuel ratio AF (see FIG. 3F), the step 68 rapidly increases the target intake manifold pressure $P_T$. The increase in the pressure $P_T$ allows the step 140 to increase the commanded engine speed $N_C$ up to 1000 RPM without a significant engine speed error $N_{ERR}$ or a significant air/fuel error $AF_{ERR}$ ($AF_{ERR}=AF-AF_{MIN}$).

Referring to FIG. 3D at time T=55 seconds, once the commanded engine speed $N_C$ has reached a predetermined speed (e.g., 1000 RPM), the step 68 reduces the target intake manifold pressure $P_T$ towards a base intake manifold pressure of 35 kPa. However, the step 68 does not allow the target intake manifold pressure $P_T$ to reach the base intake manifold pressure because doing so would result in the air/fuel ratio AF decreasing below the minimum air/fuel ratio $AF_{MIN}$. Referring to FIG. 3C at time T=55 seconds, the exhaust temperature of the exhaust gas entering filter assembly 24 is about 550° C. Accordingly, the exhaust gas incinerates the carbon particles in the filter 48 and regenerates the filter 48.

A method for controlling an engine exhaust temperature in accordance with the present invention represents a significant improvement over conventional methods. In particular, the inventive method allows for the regeneration of particulate filters during low engine speeds (e.g., engine speed less than 1000 RPM) and/or low engine load conditions. As a result, the inventive method allows particulate filters to operate more effectively when the vehicle engine is idling or is being operated at relatively low speeds. The invention may further include the automotive vehicle 10 having the engine 12 and the filter assembly 24 controlled using the above-identified inventive method.

While the invention has been particularly shown and described with reference to a preferred embodiment thereof, it is well understood by those skilled in the art that various changes and modifications can be made in the invention without departing from the spirit and the scope of the invention.

We claim:

1. A method of controlling an exhaust gas temperature of an internal combustion engine during low engine speeds or low engine load conditions, said engine having cylinders, an intake manifold, and a throttle valve disposed within said intake manifold, comprising the steps of:

calculating a target engine operational parameter responsive to an air/fuel ratio of said engine and an engine speed error of said engine;

calculating a commanded position for said throttle valve responsive to said target engine operational parameter and a measured engine operational parameter; and, controlling said throttle valve responsive to said commanded position to control said exhaust gas temperature.

2. The method of claim 1 wherein said target engine operational parameter comprises a target intake manifold pressure and said measured engine operational parameter comprises a measured intake manifold pressure.

3. The method of claim 1 wherein said target engine operational parameter comprises a target intake manifold mass air flow and said measured engine operational parameter comprises a measured intake manifold mass air flow.

4. The method of claim 1 wherein said target engine operational parameter comprises a target air/fuel ratio and said measured engine operational parameter comprises a measured air/fuel ratio.

5. The method of claim 1 wherein said air/fuel ratio comprises a measured air/fuel ratio in said engine.

6. The method of claim 1 wherein said air/fuel ratio is calculated responsive to a fueling level of said engine and a measured mass air flow in said intake manifold.

7. The method of claim 1 wherein said step of calculating said target engine operational parameter includes the substeps of:

calculating a first target offset responsive to said engine speed error;

calculating a second target offset responsive to said air/fuel ratio;

adding said first target offset to said second target offset to obtain a target reference offset; and, adding said target reference offset to a predetermined base engine operational parameter to obtain said target engine operational parameter.

8. The method of claim 1 wherein said step of calculating said commanded position of said throttle valve includes the substeps of:
 subtracting said target engine operational parameter from a measured engine operational parameter to obtain an engine operational parameter error;
 calculating a first target position responsive to said engine operational parameter error and a measured position of said throttle valve;
 setting a second target position equal to a predetermined position; and,
 calculating said commanded position of said throttle valve responsive to said first target position and said second target position.

9. The method of claim 1 further comprising the step of:
 setting said commanded engine speed to a predetermined speed to further control said exhaust gas temperature.

10. The method of claim 1 further comprising the step of:
 injecting a predetermined amount of fuel into one of said cylinders late in a power stroke of said cylinder to further control said exhaust gas temperature.

11. A method of controlling an exhaust gas temperature of an internal combustion engine during low engine speeds or low engine load conditions, said engine having cylinders, an intake manifold, and a throttle valve disposed within said intake manifold, comprising the steps of:
 calculating an engine speed error responsive to a measured engine speed and a commanded engine speed;
 calculating a fueling level responsive to said engine speed error;
 calculating an air/fuel ratio responsive to said fueling level of said engine and a measured mass air flow in said intake manifold;
 calculating a target engine operational parameter responsive to said air/fuel ratio of said engine and said engine speed error of said engine;
 calculating a commanded position for said throttle valve responsive to said target engine operational parameter and a measured engine operational parameter; and,
 controlling said throttle valve responsive to said commanded position to control said exhaust gas temperature.

12. The method of claim 11 wherein said target engine operational parameter comprises a target intake manifold pressure and said measured engine operational parameter comprises a measured intake manifold pressure.

13. The method of claim 11 wherein said target engine operational parameter comprises a target intake manifold mass air flow and said measured engine operational parameter comprises a measured intake manifold mass air flow.

14. The method of claim 11 wherein said target engine operational parameter comprises a target air/fuel ratio and said measured engine operational parameter comprises a measured air/fuel ratio.

15. The method of claim 11 wherein said step of calculating said target engine operational parameter includes the substeps of:
 calculating a first target offset responsive to said engine speed error;
 calculating a second target offset responsive to said air/fuel ratio;
 adding said first target offset to said second target offset to obtain a target reference offset; and,
 adding said target reference offset to a predetermined base engine operational parameter to obtain said target engine operational parameter.

16. The method of claim 11 wherein said step of calculating said commanded position for said throttle valve includes the substeps of:
 subtracting said target engine operational parameter from a measured engine operational parameter to obtain an engine operational parameter error;
 calculating a first target position responsive to said engine operational parameter error and a measured position of said throttle valve;
 setting a second target position equal to a predetermined position; and,
 calculating said commanded position of said throttle valve responsive to said first target position and said second target position.

17. The method of claim 11 further comprising the step of:
 setting said commanded engine speed to a predetermined speed to further control said exhaust gas temperature.

18. The method of claim 11 further comprising the step of:
 injecting a predetermined amount of fuel into one of said cylinders late in a power stroke of said cylinder to further control said exhaust gas temperature.

19. An automotive vehicle comprising:
 an engine having an intake manifold and a throttle valve disposed within said intake manifold; and,
 a microcontroller configured to calculate a target engine operational parameter responsive to an air/fuel ratio of said engine and an engine speed error of said engine, said microcontroller being further configured to calculate a commanded position for said throttle valve responsive to said target engine operational parameter and a measured engine operational parameter, said microcontroller being further configured to control said throttle valve responsive to said commanded position to control an exhaust gas temperature of said engine.

20. The automotive vehicle of claim 19 further comprising a filter assembly in fluid communication with said exhaust gas of said engine wherein said filter assembly is regenerated when said exhaust gas temperature is above a predetermined temperature level.

21. A microcontroller for an engine having an intake manifold and a throttle valve disposed within said intake manifold, said microcontroller being configured to calculate a target engine operational parameter responsive to an air/fuel ratio of said engine and an engine speed error of said engine, said microcontroller being further configured to calculate a commanded position for said throttle valve responsive to said target engine operational parameter and a measured engine operational parameter, said microcontroller being further configured to control said throttle valve responsive to said commanded position to control an exhaust gas temperature of said engine.

22. A method for regenerating a particulate filter communicating with exhaust gases of an internal combustion engine, said engine having cylinders, an intake manifold providing air to said cylinders, and a throttle valve controlling an amount of air entering said intake manifold, said method comprising the steps of:
 adjusting said throttle valve to decrease an amount of air inducted into one of said engine cylinders to increase a temperature of said exhaust gases to thereby regenerate said particulate filter; and
 maintaining an engine speed of said engine above a predetermined engine speed during said adjusting of said throttle valve.

23. The method of claim 22 wherein said predetermined engine speed is a minimum operable engine speed.

24. The method of claim 22 wherein said engine speed is maintained above said predetermined engine speed based on an engine speed error.

25. The method of claim 22 further including a step of increasing a speed of said engine toward a predetermined speed to further increase said temperature of said exhaust gases.

26. The method of claim 22 further including a step of injecting a predetermined amount of fuel into one of said cylinders late in a power stroke of said cylinder to further increase said exhaust gas temperature.

27. The method of claim 22 further including a step of maintaining an air/fuel ratio of an air/fuel mixture combusted in one of said cylinders above a predetermined air/fuel ratio.

28. A method for regenerating a particulate filter communicating with exhaust gases of an internal combustion engine, said engine having cylinders, an intake manifold providing air to said cylinders, and a throttle valve controlling an amount of air entering said intake manifold, said method comprising the steps of:

indicating said particulate filter needs to be regenerated;

adjusting said throttle valve to decrease an amount of air inducted into one of said engine cylinders to increase a temperature of said exhaust gases while maintaining an engine speed above a predetermined engine speed;

increasing a speed of said engine toward a predetermined speed to further increase said temperature of said exhaust gases; and injecting a predetermined amount of fuel into one of said cylinders late in a power stroke of said cylinder to further increase said temperature of said exhaust gases.

29. The method of claim 28 further including a step of maintaining an air/fuel ratio of an air/fuel mixture combusted in one of said cylinders above a predetermined air/fuel ratio during said adjusting of said throttle valve.

30. An article of manufacture comprising:

a computer storage medium having a computer program encoded therein for controlling a regeneration of a particulate filter communicating with exhaust gases of an internal combustion engine, said engine having cylinders, an intake manifold providing air to said cylinders, and a throttle valve controlling an amount of air entering said intake manifold, said computer storage medium comprising:

code for indicating said particulate filter needs to be regenerated;

code for adjusting said throttle valve to decrease an amount of air inducted into one of said engine cylinders to increase a temperature of said exhaust gases to thereby regenerate said particulate filter;

code for maintaining an engine speed of said engine above a predetermined engine speed during said adjusting of said throttle valve; and code for maintaining an air/fuel ratio of an air/fuel mixture combusted in one of said cylinders above a predetermined air/fuel ratio.

* * * * *